Figure 1:
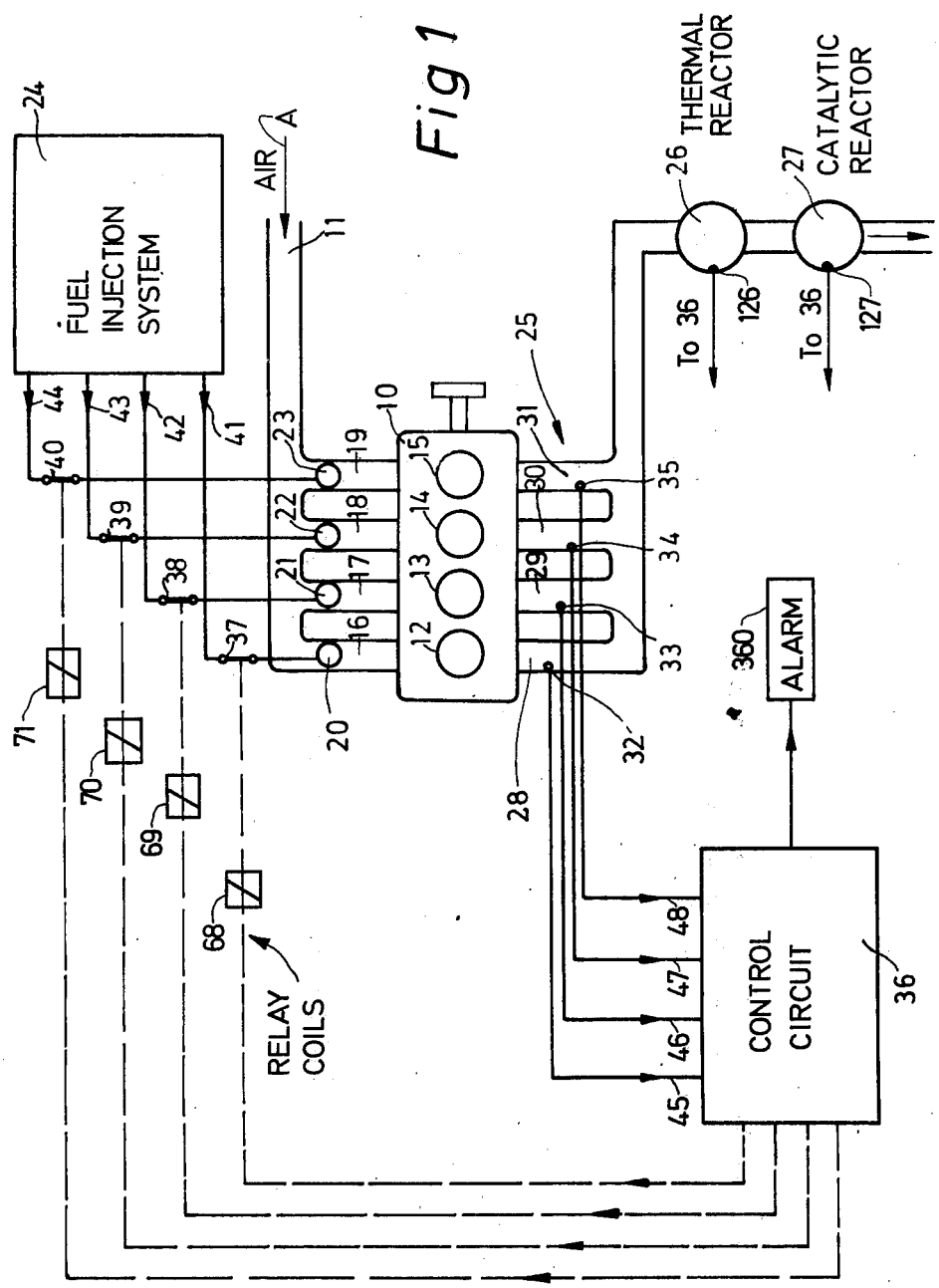

United States Patent [19]

Peter et al.

[11] 4,024,850

[45] May 24, 1977

[54] INTERNAL COMBUSTION ENGINE MONITOR SYSTEM

[75] Inventors: Bernd Peter, Kornwestheim; Peter Jürgen Schmidt, Schwieberdingen, both of Germany

[73] Assignee: Robert Bosch GmbH, Stuttgart, Germany

[22] Filed: Apr. 29, 1974

[21] Appl. No.: 465,351

[30] Foreign Application Priority Data

June 14, 1973 Germany ............................ 2330258

[52] U.S. Cl. ................................. 123/198 F; 60/277; 123/198 DB; 116/114 AF
[51] Int. Cl.² ................................. F02B 77/00; F01N 3/00
[58] Field of Search .... 123/32 EA, 198 F, 198 DC, 123/198 DB; 60/277; 116/114 AF

[56] References Cited

UNITED STATES PATENTS

| | | | |
|---|---|---|---|
| 3,472,068 | 10/1968 | List | 60/277 |
| 3,576,182 | 4/1971 | Howland | 60/277 |
| 3,738,108 | 6/1973 | Goto | 60/277 |
| 3,756,205 | 9/1973 | Frost | 123/198 F |
| 3,760,781 | 9/1973 | Boldt | 123/198 DC |
| 3,916,622 | 11/1975 | Gospodar | 60/277 |

*Primary Examiner*—Ronald B. Cox
*Attorney, Agent, or Firm*—Flynn & Frishauf

[57] ABSTRACT

A sensing means is provided to monitor combustion of fuel and air supplied to an internal combustion engine, for example by sensing ignition pulses, combustion pressure, or cylinder temperature. Signals, as sensed, are evaluated and if one of these signals is beyond a certain threshold (e.g. extreme with respect to a set value, or with respect to an average of all signals) as sensed by threshold switches, supply of the combustible fuel-air mixture to the specific cylinder is interrupted.

7 Claims, 5 Drawing Figures

INTERNAL COMBUSTION ENGINE MONITOR SYSTEM

CROSS REFERENCE TO RELATED PATENT AND APPLICATIONS

U.S. Pat. No. 3,483,851
U.S. Ser. No. 332,040, filed Feb. 12, 1973, now abandoned
U.S. Ser. No. 472,855, filed May 23, 1974 now pending (claiming German Priority P 2,340,541.6)
U.S. Ser. No. 458.777, filed Apr. 8, 1974 now pending (claiming German Priority P 2,319,576.8)

The present invention relates to internal combustion engine systems and more particularly to control of a protective system for reactors installed in the exhaust system of internal combustion engines.

Cross-reference application Ser. No. 332,040, filed Feb. 12, 1973, now abandoned, assigned to the assignee of the present invention, describes a system in which reactors, designed to reduce noxious emissions of exhaust gases, are protected from excessive temperatures. The present invention is an improvement of said system, and the disclosure of the aforementioned application Ser. No. 332,040 is incorporated herein.

Various types of exhaust gas treatment systems have been proposed; a detailed discussion is found in the above cross-referenced application. These systems include catalytic reactors wich are particularly sensitive to excessive temperatures. Excessive temperatures may arise in reactors, during engine operation, due to malfunction of the engine itself. If, for example, there is trouble in the ignition system such that one or more cylinders of the internal combustion engine are supplied with combustible air-fuel mixture which is not burned, extremely high temperatures may arise which may lead to destruction of the catalytic reactors. The air-fuel mixture which is still combustible is exhausted from the cylinder without having been burned, or burned only incompletely. It is then applied, as such, to the catalytic reactors connected to the internal combustion engine. The catalysts therein, already at high temperature level, are supplied suddenly with additional excess energy so that the temperature at the catalyst will rise, and may rise rapidly to a level at which damage of the reactor system may result.

The cross-referenced application Ser. No. 332,040 (now abandoned) describes a system in which faulty combustion is monitored, and signals indicative of combustion events in the various cylinders of an internal combustion engine are obtained.

The present invention is directed to a system and circuit evaluating the thus obtained signals, which is to be fail-safe, simple and suitable for rough automotive use.

SUBJECT MATTER OF THE PRESENT INVENTION

Briefly, each cylinder of the internal combustion engine has a sensor associated therewith which senses whether combustion occurs in the cylinder. The output of the sensor, an electrical signal, is applied to a control circuit which includes a group of threshold switches, one for each sensor, which have a threshold setting which sets a predetermined command or reference value. If the signals from the sensors deviate from this command or reference value by passing the threshold, then the threshold switch changes state which energizes apparatus to interrupt supply of combustible fuel-air mixture to the respective cylinder, from which the signal was derived which triggered change of state of the respective threshold switch.

The threshold level may be a fixed level, set into the switch, for example, by its design; it may be a dynamic level, by obtaining an average value from all, or a group of the outputs from the sensors and then obtaining an average value, which average is determinative of the threshold level; if a specific signal is an extreme with respect to this average value, the respective threshold switch will respond.

In accordance with a feature of the invention, the circuit can be so designed that malfunction of a sensor also leads to interruption of supply of a combustible fuel-air mixture to the respective cylinder, in which the sensor which does not operate properly, is located. The invention further contemplates the generation of a warning signal, which energizes a warning device for the operator of the internal combustion engine, typically the driver of a motor vehicle in which it is installed, so that the operator will be warned that repair is necessary.

The invention will be described by way of example with reference to the accompanying drawings, wherein:

FIG. 1 illustrates the general system of the monitoring system of the aforementioned cross-referenced application Ser. No. 332,040, now abandoned in which the invention is incorporated. FIGS. 2-6 of the cross-referenced application are hereby incorporated by reference. The present invention is applicable to all the embodiments and features of FIGS. 1-6 of the cross-referenced application, now abandoned.

Figure 2:
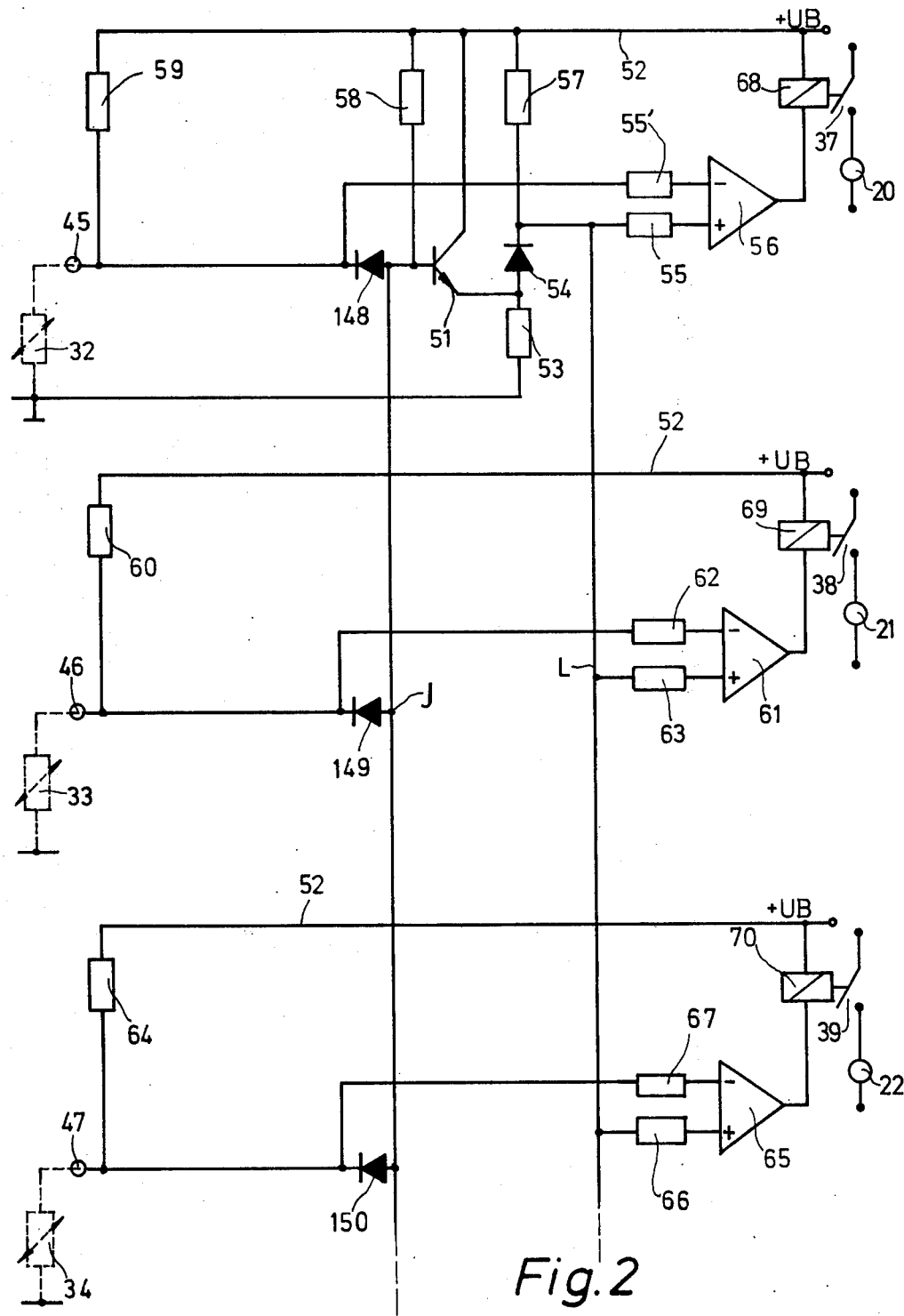
Figure 3:
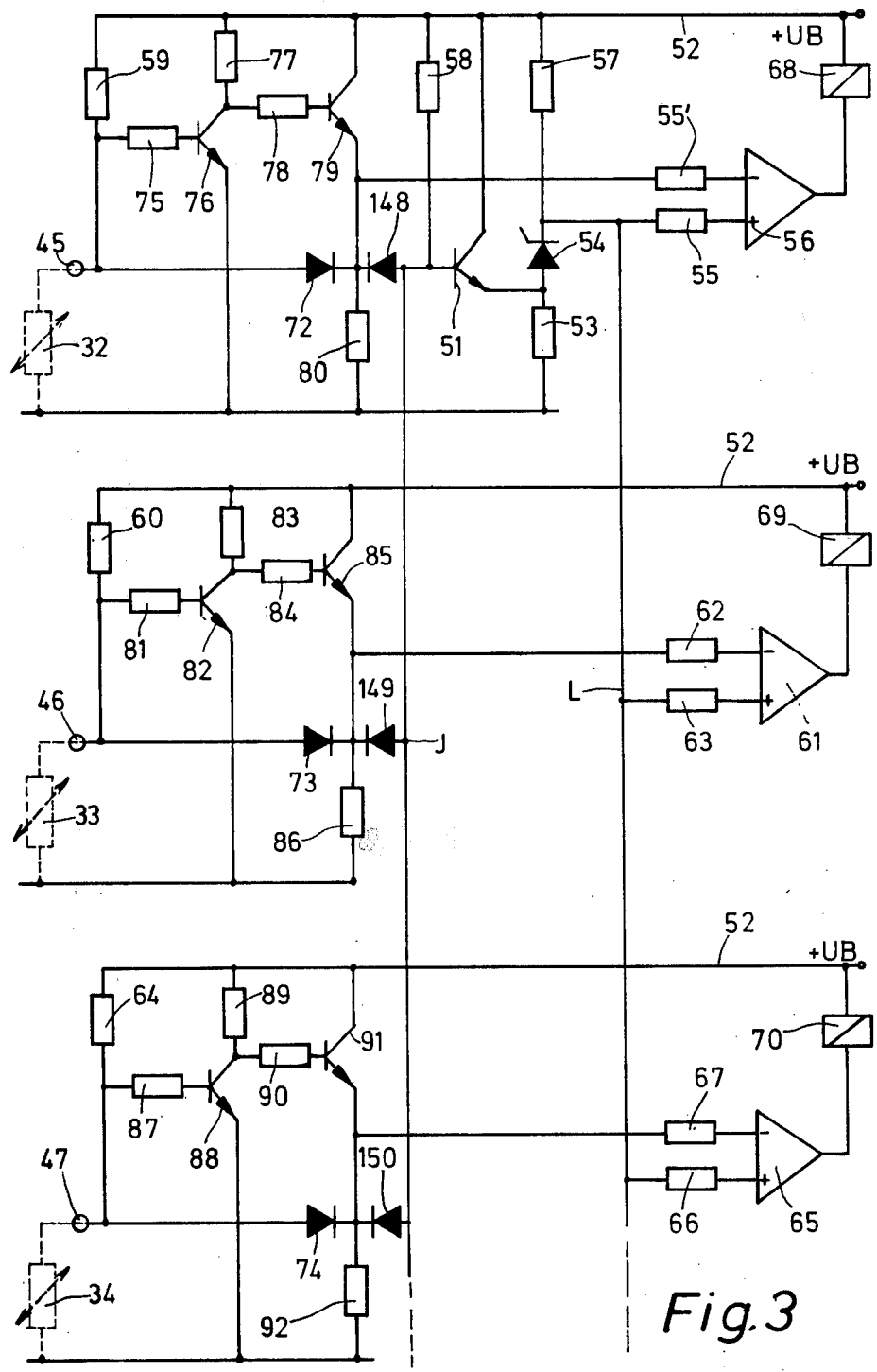
Figure 4:
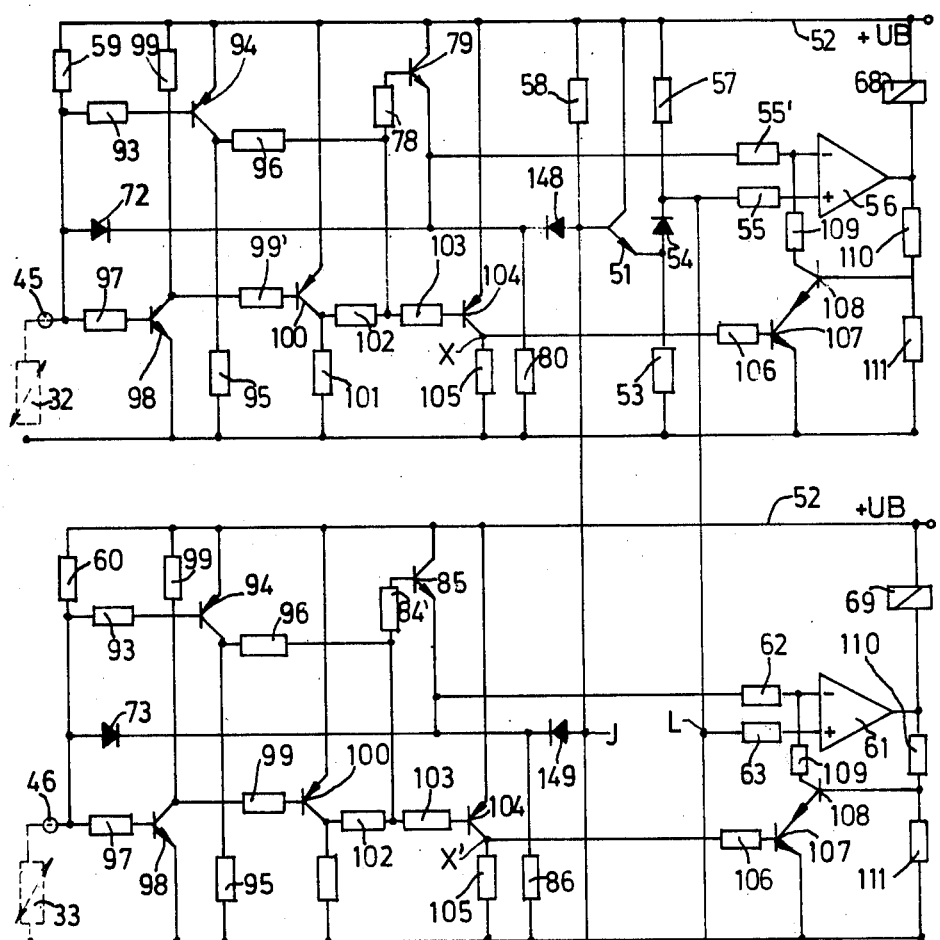
Figure 4:
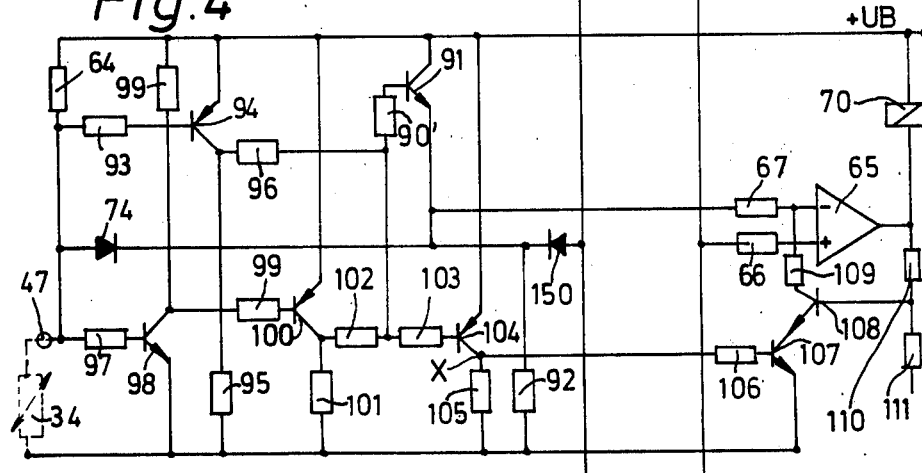
Figure 5:
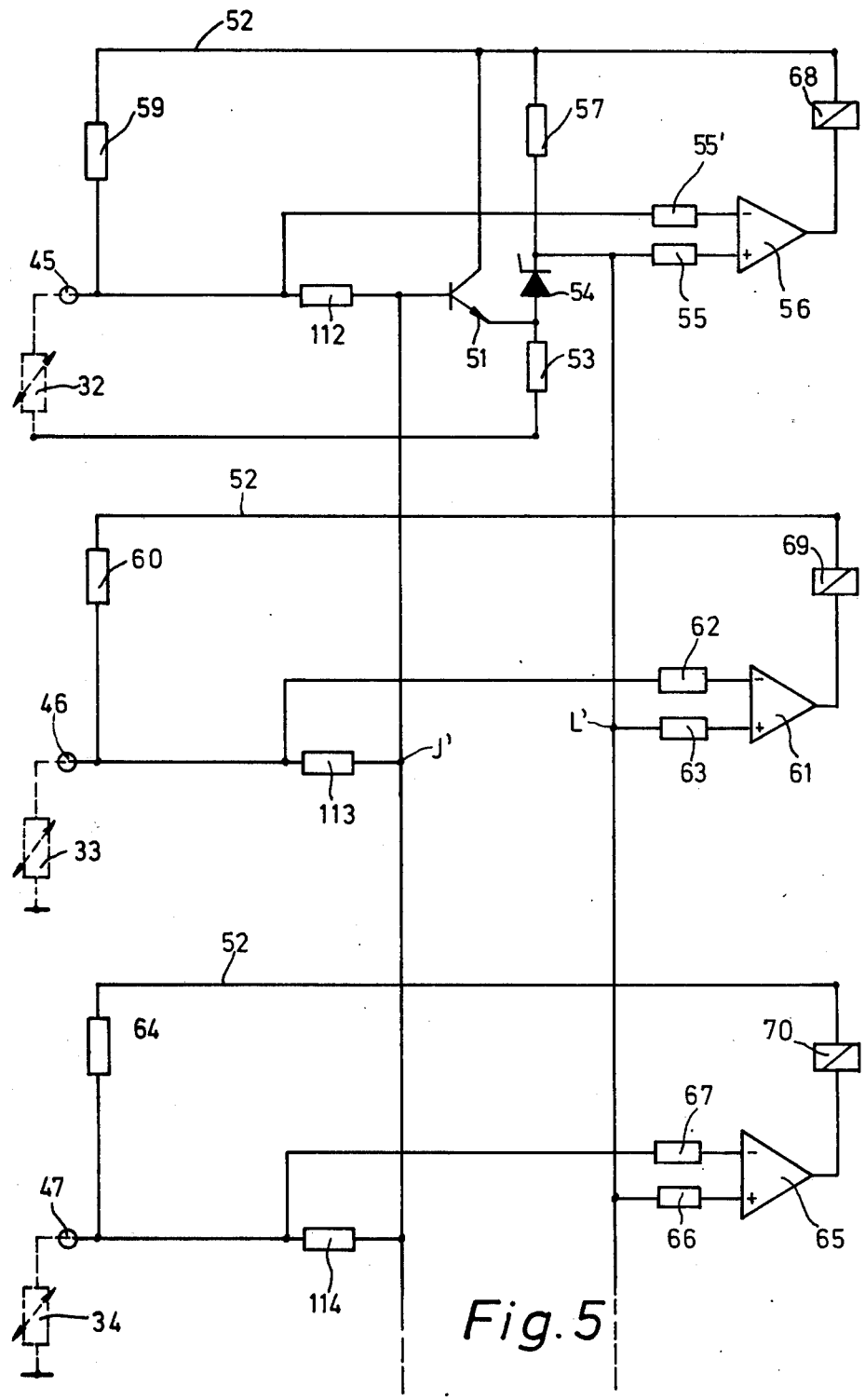

FIGS. 2, 3 and 4 are circuit diagrams of the control unit, and illustrating the construction of the threshold switches, in which the command or reference value corresponds to a predetermined temperature level; and FIG. 5 is a detailed circuit diagram of the threshold switches in which the command or reference value is derived from an average signal formed of the outputs derived from the sensors associated with all the cylinders, or with a group of cylinders.

Internal combustion engine 10, shown as a four-cylinder engine for purposes of this explanation, has air supplied thereto through inlet manifold 11, as indicated by arrow A. Inlet manifold 11 branches into inlet stubs or branches 16, 17, 18, 19. Each one of the inlet branches 16–19 has a fuel injection valve 20, 21, 22, 23 associated therewith, to inject fuel into the inlet stub or branch. The fuel injection valves 20–23 are opened for a predetermined period of time, depending on power requirements and operating parameters of the engine, by a fuel injection control system 24 which may, for example, be of the type of the cross-referenced U.S. Pat. No. 3,483,851. Electrical control lines 41, 42, 43, 44 connect the fuel injection system 24 to the injection valves 20–23. Normally closed switching contacts 37, 38, 39, 40 of relays 68, 69, 70, 71 are included in the respective lines 41–44.

The exhaust system 25 of the internal combustion engine 10 includes a thermal reactor 26 and a catalytic reactor 27. Noxious exhaust gases are reduced in the reactors, thermal reactor 26 acting as an after-burner to oxidize any remaining CO, and unburned hydrocarbons, and providing a slightly reducing atmosphere to catalytic reactor 27 in which the $NO_x$ components are reduced.

Temperature sensors 126, 127 are located in the reactors 26, 27, respectively. The temperature sensors 126, 127 may be connected to a control unit 36. Control unit 36 is additionally connected to temperature sensors 32, 33, 34, 35 located in the exhaust branches or stubs 28, 29, 30, 31 leading from cylinders 12, 13, 14, 15 of engine 10 to the exhaust manifold, and forming part of the exhaust system 25 of internal combustion engine 1. Sensors 32–35 are connected to junctions 45, 46, 47, 48 on the control unit 36 by means of suitable connection lines. Depending on the temperature relationships sensed by sensors 126, 127 (if connected) associated with the reactors, and the temperatures in the exhaust stubs 28–31, as communicated to the control system 36 over junctions 45–48, the control system provides output signals on individual output lines to the switches 68–71 to interrupt the specific connection line 41–44 from the fuel injection system 24 to the respective valves 20–23 to isolate the inlet branch or stub leading to the particular cylinder in which trouble has been sensed, that is, interrupting the supply of fuel to the respective cylinder 12, 13, 14, 15 of engine 10.

The control unit 36 includes, internally, threshold switches.

OPERATION

The sensing elements 126, 127 sensing temperature of the reactors 26, 27 provide reactor temperature sensed output signals, sensing elements 32–35 provide exhaust gas temperature output signals. If these output signals exceed a certain threshold level, as determined by threshold switches, in control unit 36 to which the sensed temperature signals are connected, a signal is derived from the respective threshold switch, the level of which is exceeded to determine which one of the respective cylinders 12–15 of engine 10 does not have normal combustion of the fuel, that is, which of the cylinders is responsible for decrease of exhaust temperature, or for increase of the temperature in the reactors 26, 27, respectively. The threshold levels for the two reactors 26, 27 need not be the same as that for the exhaust stubs 28–31. The threshold switches in unit 36 include a group of threshold switches providing an output signal if threshold levels are exceeded. This can be done, easily, by applying the connection from the sensors 126, 127 to an input stage of the threshold switch which includes, for each sensor, a separately tapped resistor. The reactor temperature, as sensed by the temperature sensors 126, 127, and after having triggered a threshold switch in unit 36, may be compared with the temperature signals applied at terminals 45–48, and that terminal is selected which indicates the lowest temperature sensed in all the exhaust branches or stubs. This is the cylinder which causes difficulty, that is, the cylinder in which no combustion took place, and the unit 36 will provide an output signal identifying the specific cylinder of cylinders 12–15 having the lowest signal derived from sensors 32–35 and the respective relay 68–71 will be energized to open its contact. Simultaneously, an optical or other alarm indicator 360 is energized so that the operator, for example the driver of an automotive vehicle, will be given an indication that one of the cylinders of the engine is not functioning properly.

In one embodiment of the invention, the threshold is selected in accordance with normal engine operating temperatures. In another form of the invention, the particular signal representative of improper operation, that is, improper combustion in any one cylinder, may be identified in the unit 36 by averaging the signals from all the cylinders and comparing the individual signals from the cylinders with the averaged signal. That one of the individual cylinder signals which exceeds the threshold determined by the averaged signal then will identify the particular cylinder in which the combustion event is improper.

The specific cylinder which is responsible for trouble in the entire motive system, including the exhaust, thus does not receive a fuel-air mixture for combustion, or for subsequent, non-combusted exhaust. In the example of FIG. 1, supply of fuel to the respective cylinder is interrupted by opening the control line to the respective fuel injection valve. Different connections or structures can be used; rather than utilizing relay contacts 37–40 to break the connection lines, switches could be used to short-circuit or bypass opening pulses from the fuel injection system around the respective injection valves 20–23. Semiconductor switches or otherwise controlled switches operating under control signals applied from the lines to relays 68–71 may be used.

The system, as described, interrupts fuel supply to the specific cylinder in which combustion does not occur anyway. Thus, interruption of fuel to the specific cylinder does not additionally interfere with operation of the engine.

In a preferred form, the temperature sensors 32–35 are located as closely to the exhaust valves from the respective cylinders as possible so that, effectively, the temperature of the exhaust gas at the exhaust valves themselves is being measured. It is also possible to measure the temperature of the exhaust gases from the cylinders arising in the exhaust stubs or branches at a somewhat more remote point, for example along or on the respective exhaust manifold connection, the connection to the cylinder block, near the stubs, or near the point at which the various exhaust stubs or branches merge into the manifold itself. These temperatures, as sensed, then can directly control interruption of combustible mixture to the respective cylinder. Additionally, over-temperature condition can be sensed by sensors 126, 127. Sensors 126, 127 determine over-temperature condition of the reactors; and sensors 28–31 determine under-temperature conditions, i.e. failure of combustion in any one cylinder, and further identify the source of trouble.

The temperature need not be sensed adjacent the exhaust valves or the exhaust stubs or manifold of the system, but rather in the cylinder heads of the internal combustion engine directly. Since the cylinder head is cooled, frequently water-cooled, temperature sensors operative at lower temperatures can be used, thus simplifying the construction and permitting use of cheaper sensing elements.

The embodiments of the invention shown in FIGS. 2–6 of the cross-referenced application (now abandoned) are equally applicable to the present invention, in which the control circuit 36 inhibits application of a combustible fuel-air mixture to a respective cylinder, or group of cylinders, of the internal combustion engine, as sensed by sensing characteristics of a combustion event (temperature in the exhaust; temperature in the combustion chamber, or pressure in the combustion chamber) and then controls application of fuel, or air, in highly insufficient or greatly excessive quantity to the respective cylinder, or group of cylinders, to prevent excessive reactor temperatures from arising.

Threshold switches similar to those described may be connected to the output from sensors 126, 127 to sense high temperatures over a design limit, or over the average of the signal from the sensors 126, 127. If desired, normalization of the signals with respect to each other (to compensate for differences, for example, in externally expected cooling) may be used so that averaging, or sensing a level with respect to a design threshold can effect true comparison of signals representative of temperature (or ignition events) to be compared. Such normalization of signals can readily be instrumented by passing the respective signals through voltage dividers of appropriate voltage division ratios.

The detailed circuit diagram of the threshold switches in control unit 36 is, basically, shown in FIG. 2. For convenience and legibility of the drawing, only three fuel injection valves 20, 21, 22 of the four valves 20–23 of FIG. 1 have been illustrated. The expansion of the system to four cylinders, six, or eight cylinders, or to control a group of cylinders, is obvious from the drawing.

The temperature sensors 32–35 (of which three sensors 32–34 are shown) are preferably negative temperature coefficient (NTC) resistors. The NTC resistors 32–34 are connected with one terminal to ground or chassis of the motor vehicle; the other terminal is connected to junctions or terminals 45–47. Terminals 45–47 are connected with the cathode of a diode 148, 149, 150, each, the anodes of which are connected together at a common junction J. The common junction J is connected to the base of an emitter-follower connected npn transistor 51. The collector of the transistor is connected to positive bus 52, forming a common supply line supplied from a source of positive potential $U_B$, for example the battery of an automotive vehicle. The emitter of the transistor 51 is connected to the junction point of a resistor 53 and a Zener diode 54. The anode of Zener diode 54 is connected to resistor 53, the other terminal of which is connected to chassis. The cathode of Zener diode 54 is connected to a common line L. Resistors 55, 63, 66 are, each, connected to the direct terminal of operational amplifiers 56, 61, 65, respectively. The output of operational amplifier 56 is connected to relay coil 68 which operates relay switch 37, in series with injection valve 20. Relay contact 37 is normally closed, so that it will be opened when relay coil 68 is energized. The second terminal of the relay coil 68 is connected to the common positive supply bus 52. The cathode of the Zener diode 54 is further connected over a resistor 57 to bus 52. The base of transistor 51 is likewise connected over a base resistor 58 to bus 52. The cathode of diode 148 is connected over a coupling resistor 55' to the inverting input of operational amplifier 56. A resistor 59 further connects from terminal 45 to the positive bus 52.

Sensors 33, 34, likewise being NTC resistors, are similarly connected to resistor 32. Resistors 60, 64 each connect, respectively, from terminals 46, 47 to positive bus 52. The terminals 46, 47 are further connected over coupling resistors 62, 67 to the inverting inputs of the operational amplifiers 61, 65 which, each, are connected through the respective relay coils 69, 70 to positive bus 52. Other sensors, such as sensor 35, or sensors 126, 127 may be similarly connected to the same lines J, L or to separate threshold circuits constructed similarly.

OPERATION

NTC resistors 32, 33, 34 (and such other resistors connected to the same network) together with resistors 59, 60, 64 form, each, a voltage divider. The tap point of this voltage divider is coupled over diodes 148, 149, 150 to the transistor 51. The output of the transistor, in this case the emitter (in view of the emitter-follower connection) has a voltage thereat which corresponds to the highest temperature at the respective cylinders of the engine. That cylinder which results in the highest output temperature will determine the voltage passed over the diodes 148, 149, 150. When all diodes 148, 149, 150 are conductive, the voltage will be determined by the voltage at the anode connected to the respective resistor 32, 33, 34 which has the lowest value. The voltage at the emitter of transistor 51 is shifted in positive direction by the value of the Zener voltage of Zener diode 54. At the direct inputs of operational amplifier 56, 61, 65, therefore, an electrical signal will be applied which forms a temperature command or reference value. This temperature reference value corresponds to the highest exhaust temperature in any one of the cylinders 12, 13, 14, 15 of engine 10.

If the temperature of the exhaust gases in one of the outlet stubs 28–31 drops below the command value, corresponding to the highest temperature, established by the Zener diode 54, the voltage at the input terminals 45, 46, 47 will change by applying an increase in voltage. This signal is transferred over the input resistors 55', 62, 67 to the inverting input of the operational amplifier 56, 61, 65, respectively, so that the output of the respective operational amplifier will have a negative voltage thereat. This causes current flow through the respective relay coil and the respective relay 68, 69, 70 will be energized, thereby opening the respective switch 37, 38, 39, and interrupting supply of fuel to the respective cylinder 12–15 which caused the increase in temperature.

The basic circuit of FIG. 2 can be expanded to provide an inherent fail-safe feature to provide protection in case one of the NTC resistors 32–34 should fail. Similar elements have been given similar reference numerals and will not be described again. The relay switches 37–39 and the injection valves 20–22 have been omitted from FIG. 3 for clarity.

The output terminal from the NTC resistor, for example terminal 45 of resistor 32, is connected to the anode of a diode 72, having its cathode connected to the cathode of diode 148 which, further, is connected over a resistor 80 to chassis. Similarly, terminals 46, 47 are connected over diodes 73, 74 to diodes 149, 150, and resistors 86, 92 connect to chassis. Diodes 148, 149, 150 have their anodes connected to common junction J, which is connected through the emitter-follower transistor 51, Zener diode 54, to common line L which, in turn, has taps connecting over coupling resistors 55, 63, 66 to the direct inputs of operational amplifiers 56, 61, 65. The command or reference signal representative of the command reference temperature, or threshold level for the operational amplifiers 56, 61, 65 is thereby determined, the reference temperature being the highest exhaust temperature arising in any one of the exhaust stubs 28–31 of engine 10 (FIG. 1), the electrical signal being shifted by the value of the Zener voltage of Zener diode 54.

Terminal 45, further, is connected over a base resistor 75 to the base of a transistor 76, the emitter of which is connected to chassis, and the collector of which is connected over collector-resistor 77 to positive bus 52. Collector coupling resistor 78 connects to the base of a transistor 79, the collector of which is connected directly with positive bus 52 and the emitter of which is connected to the junction between the cathodes of the two diodes 72, 148, and the emitter resistor 80. Similarly, terminals 46 are connected to a base resistor 81, which connects to a transistor 82, having a collector resistor 83; coupling resistor 84 connects to transistor 85 which, also, is connected to the junction of the diodes 73, 149, resistor 86 and connection to the inverting input coupling resistor 62 of operational amplifier 61. Likewise, junction 47 of the third cylinder has resistor 87 connected to the base of transistor 88, the collector of which has a collector resistor 89; coupling resistor 90 connects to the base of transistor 91 which is connected to the junction between the cathodes of diodes 74, 150, resistor 92 and coupling resistor 67 connecting to the inverting input of operational amplifier 65. Other, similar circuits may likewise be connected similarly.

OPERATION

The reference or command value is applied to the operational amplifiers 56, 61, 65 over emitter follower transistor 51 and Zener diode 54, and the diodes 148, 149, 150 representative of the highest temperature at any one of the cylinders, as sensed by sensors 32, 33, 34, as determined by the voltage which appears at the input terminals of that one of the NTC resistors 32, 33, 34, which has the lowest resistance value. This signal is transferred to the base of the transistor 51, and shifted by the Zener voltage of Zener diode 54. Under normal operation, the system of FIG. 3 operates identically to that of FIG. 2.

If one of the sensors 32, 33, 34 should malfunction, for example should break or become open circited, then nothing further need be done and the circuit of FIG. 2 would likewise operate since, in this case, a low temperature is simulated, due to the high (infinity) value of the open resistor, and the respective operational amplifier will respond causing operation of the respective relay 68–70 and interrupting fuel supply to the corresponding injection valve.

Upon short circuit of one of the NTC resistors 32–34, however, a very high temperature would be simulated, thus simulating a high reference or command temperature for the operational amplifiers 56, 61, 65. The circuits including transistors 76, 79; 82, 82, 85; 88, 91 are provided in order to avoid this result. The transistors, in their circuits, form limit switches. Let it be assumed that NTC resistor 32 has a short circuit. Terminal 45 will have a negative or chassis voltage applied thereto. This causes transistor 76 to block. As transistor 76 blocks, the voltage at its collector, and therefore on the base of the subsequently connected transistor 79 will become positive, thus causing transistor 79 to conduct, shifting the voltage at the cathode of diodes 148, 72 in positive direction. Diode 148 will block and the short-circuited NTC resistor 32 will be entirely disconnected. Diode 72 is likewise blocked when transistor 79 is conductive, so that the inverting input of operational amplifier 56 will likewise have a positive potential. This simulates an exhaust temperature which is too low in the respective exhaust stub 28–31, so that the output of operational amplifier 56 will have a negative voltage thereat, causing operation of relay 68 and consequent blocking of supply of fuel to the respective fuel injection valve.

The limit switches in the other circuits connected to sensors 33, 34 operate similarly. The circuit, therefore, will sense malfunction of combustion in one of the cylinders, for example upon failure of ignition; it will further sense failure of the temperature sensor, both with respect to an open circuit as well as with respect to a short circuit, in any case interrupting fuel supply to the respective fuel injection valve so that the reactors 26, 27 in the exhaust system are reliably protected from over-heating, even if the monitoring or sensing device should fail.

It may be undesirable that supply of combustible fuel-air mixture to a cylinder is interrupted if the monitoring system itself fails, rather than combustion in the cylinder itself. FIG. 4 shows a circuit in which failure of one of the NTC resistors does not necessarily disconnect the the corresponding fuel injection valve but, rather, provides an alarm indication to the operator that the monitoring system is not functioning reliably, that is, that one of the NTC resistors 32–34 has failed.

Parts similar to those previously explained in connection with FIGS. 2 and 3 will not be explained again and have been given the same reference numerals.

NTC resistor 32 and resistor 59 form a voltage divider, the tap point of which is connected not only to the base resistor 93 for transistor 94 but further to the base resistor 97 of a transistor 98. The emitter of transistor 98 is connected to chassis; the collector of transistor 98 is connected over collector resistor 99 to bus 52. Further, the collector of transistor 98 is connected over a base resistor 99' to a transistor 100, the emitter of which is connected to the positive bus 52. The collector of transistor 100 is connected over collector resistor 101 to chassis, and over coupling resistor 102 to the junction of resistors 96 and 78', and then over a resistor 103 to the base of a transistor 104. Resistor 102, together with base resistor 103 of transistor 104 forms a series circuit between which the resistors 96 and 78 are connected. Transistor 104 has its emitter connected to the common bus 52 and its collector over collector resistor 105 to chassis. The collector of the transistor 104 can, further, be connected to an indicator, such as an incandescent lamp as indicated by terminal X. Resistor 105 may also be used to indicate the switching state of the transistor 104. The collector of transistor 104 is connected to the base resistor 106 of a transistor 107, the emitter of which is connected to chassis. The collector of transistor 107 is connected to the emitter of a transistor 108, the collector of which is connected over a resistor 109 to the inverting input of operational amplifier 56. The output of the operational amplifier 56 is connected to a series circuit of two resistors 110, 111 which, finally, connect to chassis. The junction point of the two resistors 110, 111 is connected to the base of the transistor 108.

The circuits connected to the NTC resistors 33, 34 are identical to the circuit just described and same parts have, therefore, been given the same reference numerals.

Operation—with reference to the diagram portion connected to NTC resistor 32: The reference or command voltage applied to the direct input of the operational amplifier 56 is generated as explained in connection with FIG. 2, determined by the diodes 148, 149, 150, and generated by transistor 51 and Zener diode 54.

Let it be assumed that the NTC resistor 32 has been damaged or destroyed, so that, effectively, terminal 45 is at an open circuit. Terminal 45 will, therefore, have a positive voltage applied. This positive voltage is connected to the base of transistor 94, which will block, so that the collector of transistor 94 will have a negative voltage. This negative voltage is applied to the base of transistor 104 over coupling resistor 96, causing transistor 104 to become conductive. The collector of transistor 104 will now have a positive signal applied, which can be used to indicate that the NTC resistor 32 is defective. Additionally, transistor 107 is controlled to become conductive, which controls the voltage at the inverting input of the operational amplifier 56 to become negative so that the output of the operational amplifier 56 will have a positive signal appear thereat, thus preventing pull-in of relay 68, and inhibiting interruption of fuel from the injection valve 20, connected to the relay circuit associated with relay coil 68. Thus, due to the positive voltage at the collector of transistor 104 an indication of malfunction will result which can be used to indicate to the operator that repair is necessary, that is, that monitoring or sensing resistor 32 is damaged without, however, interfering with operation of the internal combustion engine.

If NTC resistor 32 is an open circuit, a low exhaust gas temperature is only simulated. Transistor 108 must, therefore, be provided. If, for example, the temperature of the exhaust gas in the respective cylinder, before failure of resistor 32, was such that it was not necessary to interrupt fuel supply to the respective injection valve, then the inverting input of operational amplifier 56 will have a negative signal applied thereto over diode 72 and resistor 55', which commands a positive signal at the output of the operational amplifier 56. This positive signal holds transistor 108 in conductive state by applying the signal over resistor 110. Thus, if the monitor apparatus and the entire internal combustion engine system operate properly and then resistor 32 fails, transistor 107 becomes conductive (as explained), and the voltage at the inverting input of operational amplifier 56 will be held at a negative value over transistor 108.

Resistor 32 may fail during malfunction of the engine. Let it be assumed that, before NTC resistor 32 failed, the temperature of the exhaust gases has dropped below the permissible value. The voltage at the inverting input of operational amplifier 56 will then be positive, and the voltage at the output of operational amplifier 56 negative, thus causing relay 68 to be energized and interruption of fuel to the respective injection valve. Negative voltage at the output of the operational amplifier 56 causes blocking of transistor 108, and the voltage at the inverting input of the operational amplifier cannot be made negative even if transistor 107 is conductive—indicative of failure of the resistor 32. The output signal at the operational amplifier 56 remains negative, and relay 68 remains energized, interrupting fuel. Fuel, therefore, is not applied through the respective injection valve while still a signal is provided to the operator that the respective NTC resistor has failed. Yet, if the temperature was proper before failure of the NTC resistor 32, relay 68 is not energized. If the exhaust gas temperature was so low, before there was trouble in the circuit of resistor 32, so that the relay 68 had been energized to interrupt fuel, then this interruption of fuel (energization of relay 68) will continue even after malfunction of the sensor resistor 32.

The sensor resistor may not only become an open circuit, it may also short-circuit. Upon short-circuiting, the negative voltage of the terminal 45 causes transistor 94 to be conductive, and transistor 98 to block, so that a positive voltage will be at the collector of transistor 98. Positive voltage at the collector of transistor 98 causes transistor 100 to block, so that its collector has a negative voltage which holds transistor 108 in conductive state, also when the failure of NTC resistor 32 is a short circuit. Simultaneously, an alarm can be taken off from terminal X. Transistor 107 and transistor 108 again hold operational amplifier 56 at negative voltage so that, upon trouble in NTC resistor 32, relay 68 will not be connected unless it had previously been energized, so that, unless there was trouble, the supply of fuel and air to the respective cylinder is not interrupted.

The transistor 79 is held over transistors 98 and 100 in conductive state when NTC resistor 32 is short-circuited. Thus, a positive voltage might be applied to the inverting input of the operational amplifier 56, causing operation of the relay 68. The transistor 108, however, holds the voltage at the inverting input of the operational amplifier 56 at a negative level, so that the relay 68 is not operated.

The remaining circuit components of the example of FIG. 4 operate similarly. Malfunction of any one of the NTC resistors 32, 33, 34 is indicated to the operator, for example by connecting a signal lamp at terminal X, or forming resistors 105, themselves, as indicators. Supply of fuel-air mixture, in combustible proportions, to the respective cylinders is not interrupted, however. If, however, in advance of malfunction of the temperature sensor 32–34, one of the sensors should have indicated cyliner malfunction, resulting in interruption of supply of a combustible air-fuel mixture to a respective cylinder, then such interruption is continued.

In the examples of FIGS. 2–4, the reference or command level of temperature for the operational amplifiers 56, 61, 65 was selected to be the highest temperaure of any one of the cylinders, so that the threshold level is determined by the highest temperature in the cylinders of the engine or the highest temperature signal derived from any one of the sensors. FIG. 5 illustrates an example in which the reference or command temperature is formed as the average of all the signals applied to the group of threshold circuits. Elements similar to those previously described have been given the same reference numerals and will not be described again in detail, and elements not necessary for an understanding of the modification have been omitted.

The voltage divider formed by NTC resistor 32 and resistor 59 is coupled, as before, by coupling resistor 55' to operational amplifier 56. The voltage divider tap is, further, coupled over a resistor 112 (and resistors 113, 114 for the sensors 33, 34) to junction J'. Resistors 112, 113, 114 replace diodes 148, 149, 150 of FIG. 2. The resistors 112, 113, 114 are adder resistors, so that the base of emitter-follower connected transistor 51 will have a signal applied thereat which is representative of the average or median value of the temperatures in the exhaust stubs 28, 29, 30 of the engine 10. This signal is shifted by Zener diode 54 by the value of the Zener voltage and applied as a temperature command value to the direct input of the respective operational amplifiers 56, 61, 65. The outputs of the operational amplifiers are again connected to the relay coils 68, 69, 70 of the respective relays which interrupt supply of combustible fuel-air mixture to the respective cylinder.

Operation: If the temperature in one of the exhaust stubs 28, 29, 30 drops, so that the temperature sensed by sensors 32, 33, 34 drops, then the respective resistance value of the resistor 32, 33, 34 will likewise drop, thus raising the voltage at the inverting input of operational amplifier 56, 61, 65 respectively. When the voltage passes the reference temperature value, as represented by the reference signal on line L', the respective operational amplifier 56, 61, 65 will switch providing a negative voltage at its output, and rendering the respectively connected relay coil conductive.

The fail-safe circuits of FIGS. 3 and 4, added to the circuit of FIG. 2 may likewise be used with the circuit of FIG. 5; the basic difference between the embodiments of FIGS. 2 and 5 is that, in FIG. 2, the highest exhaust temperature is selected as a reference, the diodes 148, 149, 150 selecting an extreme value; whereas in FIG. 5, the resistors 112, 113, 114 connect their respective signals to junction J', so that junction J' and hence the reference signal applied to line L' will be representative of an average or median value as determined by the outputs of all the sensors.

Various changes and modifications may be made within the scope of the inventive concept, and features described in connection with any one of the embodiments may, similarly, be used with any other embodiment.

We claim:

1. A reactor protective system to protect a catalytic reactor connected to a multicylinder internal combustion engine system against damage or destruction due to excessive temperatures arising in the reactor, said reactor protective system comprising
engine operation sensing means (32–35) located in sensing relation to each of the cylinders (12–15) of the engine (10), sensing a characteristic of a combustion event in the respective cylinder to monitor combustion of fuel and air supplied thereto, and providing a respective combustion monitor signal representative of conditions, indicative of presence, or absence of combustion in a respective cylinder;
supply control means (37–40; 68–71) controlling supply of combustible mixture of air and fuel to respective cylinders; and
separate threshold switches (56, 61, 65) associated with and connected to each sensing means (32–35) associated with respective cylinders of the engine, the threshold switches providing a threshold level forming a reference or command level for the combustion monitor signal of each of the cylinders and changing state if the monitor signal from the sensing means passes the threshold level of the threshold switch means, said threshold level being matched to the operating temperature of the catalytic reactor under normal conditions, said threshold switches being further connected to said supply control means to inhibit supply of combustible mixture to the respective cylinder from which a monitor signal is derived which causes the threshold switch to change state to thereby inhibit escape of unburnt fuel-air mixture from the engine into the reactor and combustion of said unburned mixture therein and thus prevent consequent damage to the reactor;
and a condition signal generating circuit (148, 149, 150, J, L; 112, 113, 114, J', L'; 51, 54) generating a signal representative of, and controlling the threshold level at which the separate threshold switches (56, 61, 65) change state;
wherein the condition signal generating circuit comprises a coupling circuit (148, 149, 150; 112, 113, 114) having an output junction (J, J');
a transistor (51) in emitter-follower circuit connected to said output junction (J, J') and a Zener diode (54) coupling the transistor (51) and said separate threshold switches to apply the signal controlling the threshold level of said switches to said switches.

2. A reactor protective system to protect a catalytic reactor connected to a multicylinder internal combustion engine system against damage or destruction due to excessive temperatures arising in the reactor, said reactor protective system comprising
engine operation sensing means (32–35) located in sensing relation to each of the cylinders (12–15) of the engine (10), sensing a characteristic of a combustion event in the respective cylinder to monitor combustion of fuel and air supplied thereto, and providing a respective combustion monitor signal representative of conditions, indicative of presence, or absence of combustion in a respective cylinder;
supply control means (37–40; 68–71) controlling supply of combustible mixture of air and fuel to respective cylinders; and
separate threshold switches (56, 61, 65) associated with and connected to each sensing means (32–35) associated with respective cylinders of the engine, the threshold switches providing a threshold level forming a reference or command level for the combustion monitor signal of each of the cylinders and changing state if the monitor signal from the sensing means passes the threshold level of the threshold switch means, said threshold level being matched to the operating temperature of the catalytic reactor under normal conditions, said threshold switches being further connected to said supply control means to inhibit supply of combustible mixture to the respective cylinder from which a monitor signal is derived which causes the threshold switch to change state to thereby inhibit escape of unburnt fuel-air mixture from the engine into the reactor and combustion of said unburned mixture therein and thus prevent consequent damage to the reactor;
a condition signal generating circuit (148, 149, 150, J, L; 112, 113, 114, J', L'; 51, 54) generating a signal representative of, and controlling the threshold level at which the separate threshold switches (56, 61, 65) change state;
the condition signal generating means comprising a group of diodes (148, 149, 150), each being associated with and connected to an associated sensor (32, 33, 34) and all having a common junction (J) to provide a signal representative of the extreme value of the signals from the sensors,
the threshold switches comprising operational amplifiers (56, 61, 65), one input (−) being connected to each respective associated sensor (32, 33, 34), a transistor (51) in emitter-follower circuit being connected to the common junction (J);

and a Zener diode (54) connecting the transistor (51) to the other input (+) of the operational amplifiers to connect the operational amplifiers as threshold switches discriminating between relative polarity of signals applied to the respective inputs thereof.

3. System according to claim 2, wherein the threshold switches, each, comprise an operational amplifier (56, 61, 65) having its inverting input (−) connected to a respective sensor (32–35) and its non-inverting input (+) to the output of said transistor (51) and the Zener diode (54).

4. A reactor protective system to protect a catalytic reactor connected to a multicylinder internal combustion engine system against damage or destruction due to excessive temperatures arising in the reactor, said reactor protective system comprising engine operation sensing means (32–35) located in sensing relation to each of the cylinders (12–15) of the engine (10), sensing a characteristic of a combustion event in the respective cylinder to monitor combustion of fuel and air supplied thereto, and providing a respective combustion monitor signal representative of conditions, indicative of presence, or absence of combustion in a respective cylinder;

supply control means (37–40; 68–71) controlling supply of combustible mixture of air and fuel to respective cylinders; and separate threshold switches (56, 61, 65) associated with and connected to each sensing means (32–35) associated with respective cylinders of the engine, the threshold switches providing a threshold level forming a reference or command level for the combustion monitor signal of each of the cylinders and changing state if the monitor signal from the sensing means passes the threshold level of the threshold switch means, said threshold level being matched to the operating temperature of the catalytic reactor under normal conditions, said threshold switches being further connected to said supply control means to inhibit supply of combustible mixture to the respective cylinder from which a monitor signal is derived which causes the threshold switch to change state to thereby inhibit escape of unburnt fuel-air mixture from the engine into the reactor and combustion of said unburned mixture therein and thus prevent consequent damage to the reactor;

a condition signal generating circuit (148, 149, 150, J, L; 112, 113, 114, J', L'; 51, 54) generating a signal representative of, and controlling the threshold level at which the separate threshold switches (56, 61, 65) change state;

the sensing means comprising negative temperature coefficient (NTC) resistors (32–35) and a supervisory transistor (104), conduction of said supervisory transistor (104) being controlled by the operating state of the NTC sensing resistor (32–34);

and wherein the supervisory transistor (104) is in one state of conduction upon normal operating condition of the NTC sensing resistor (32–34) and in another state of conduction upon short circuit, or open circuit of the NTC resistor (32–34);

and a threshold switch command transistor (107) is provided connected to an operational amplifier (56, 61, 65) forming part of the threshold switch, the command transistor (107) being controlled from said supervisory transistor (104) into conductive state when the supervisory transistor senses short circuit, or open circuit of the NTC sensing resistor (32, 33, 34), the command transistor being connected to the inverting input (−) of the respective operational amplifier (56, 61, 65).

5. System according to claim 4, wherein the control means (37–40; 68–71) includes a relay, each, connected to a respective operational amplifier (56, 61, 65) and, when energized, interrupting supply of combustible air-fuel mixture to a respective cylinder;

said relay (68, 69, 70) being de-energized when the command transistor (107) is conductive.

6. System according to claim 5, further comprising a coupling transistor (108) connected to the output circuit of the operational amplifier and to the command transistor (107) and having its conduction determined by the output signal at the output of the respective operational amplifier (56, 61, 65).

7. System according to claim 4, wherein the supervisory transistor (104) and the command transistor (107) are in blocked, non-conductive state when the NTC sensing resistor (32–34) is functioning normally and is operating with design parameters.

* * * * *